(12) United States Patent
Bronicki et al.

(10) Patent No.: US 6,298,663 B1
(45) Date of Patent: *Oct. 9, 2001

(54) METHOD AND APPARATUS FOR PRODUCING POWER FROM GEOTHERMAL FLUID

(75) Inventors: Lucien Y. Bronicki, Yavne; Uri Kaplan, Sorek, both of (IL)

(73) Assignee: Ormat Industries Ltd., Yavne (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/901,070

(22) Filed: Jul. 28, 1997

Related U.S. Application Data

(63) Continuation of application No. 08/384,650, filed on Feb. 6, 1995, now abandoned.

(51) Int. Cl.$^7$ ........................................................ F03G 7/00
(52) U.S. Cl. ......................................... 60/641.2; 60/641.5
(58) Field of Search .............................. 60/641.2, 641.5, 60/715, 716, 693

(56) References Cited

U.S. PATENT DOCUMENTS

| | | | |
|---|---|---|---|
| 4,127,989 | * 12/1978 | Mickelson | 60/641.2 |
| 4,576,006 | * 3/1986 | Yamaoka | 60/641.2 |
| 4,996,846 | * 3/1991 | Bronicki | 60/641.2 |
| 5,497,624 | * 3/1996 | Amir et al. | 60/641.2 |

OTHER PUBLICATIONS

ECNZ Geothermal Group Annual Environmental Report 1993–94, "Future Options", Taupo, 1994.

"Geothermal Energy", in: Hearings before the Subcommittee on Energy of the Committee on Science and Astronautics U.S. House of Representatives Ninety–Third Congress First Session on H.R. 8628, H.R. 9658, No. 21, Sep. 11, 13 and 18, 1973.

Proceedings of the 11$^{th}$ New Zealand Geothermal Workshop 1989, pp. 9, 13, 14, 19, Electricity Corporation of New Zealand Ltd., 1989.

* cited by examiner

Primary Examiner—Hoang Nguyen
(74) Attorney, Agent, or Firm—Nath & Associates PLLC; Gary M. Nath; Jerald L. Meyer

(57) ABSTRACT

Apparatus for utilizing geothermal fluid comprising a two-phase mixture of geothermal steam and brine produced by a production well, includes an input conduit connecting the production well with the separator which separates the geothermal fluid into high pressure geothermal steam and geothermal brine. A connecting conduit connects the separator to a geothermal power plant which produces power from the high pressure geothermal steam. The input conduit is shorter than said connecting conduit to reduce pressure losses due to two-phase flow in the input conduit. The geothermal power plant includes a topping steam turbine coupled to a generator, and a flow control mechanism for applying the high pressure geothermal steam to the topping steam turbine which is constructed and arranged to drive the generator and produce exhaust steam at a pressure greater than atmospheric pressure. A secondary separator receives the exhaust steam and produces condensate and dry low pressure steam which is applied to a condensing steam turbine coupled to a generator for producing power and exhaust steam that is below atmospheric pressure. The flow control system is effective to maintain a substantially constant flow rate of geothermal steam through he power plant in the face of decreasing pressure of the geothermal fluid.

41 Claims, 3 Drawing Sheets

METHOD AND APPARATUS FOR PRODUCING POWER FROM GEOTHERMAL FLUID

This application is a continuation of application Ser. No. 08/384,650, filed Feb. 6, 1995, now abandoned.

DESCRIPTION

1. Technical Field

This invention relates to a method of and apparatus for producing power from geothermal fluid, and more particularly, from geothermal fluid comprising a two-phase mixture of geothermal steam and brine.

2. Background of the Invention

Geothermal steam and brine produced by some newly discovered geothermal fields are at relatively high pressure and temperature (e.g., about 200 psia., and about 400° F.) permitting economical power generation using steam turbines. The conventional approach has been to drill a number of production wells in a field, and to construct a power plant containing steam turbines at a central location in the field convenient to a source of water for the steam condensers associated with the steam turbines. Input conduits can be many hundreds of meters in length, and would carry the geothermal fluid from the production wells to a separator located at the power plant which functions to separate the geothermal fluid into geothermal steam and geothermal brine. After heat had been extracted from the geothermal steam by the steam turbines in the power plant plant, the heat depleted steam and the brine would be disposed of in re-injection wells located away from the production wells thereby preventing the release into the atmosphere of noxious gases present in the geothermal fluid.

While the resources of a geothermal field are enormous, they are nevertheless finite; and an objective of the design of a geothermal power plant is not only to extract heat economically, taking the finite nature of the resource into account, but to extract heat as efficiently as possible from the geothermal fluid. A number of problems have consistently arisen in designing geothermal power plants using high pressure geothermal fluid that is a two-phase mixture of steam and brine. One is the pressure loss in the input conduit that connects a production well that is remote from the separator of the power plant. The pressure of the steam separated at the power plant will be considerably lower than the steam at the well head by reason of the friction losses in the input conduit due to the two-phase nature of the flow in this conduit. As a consequence, the power output of the plant is penalized even before the plant is designed.

Another problem is the reduction in well head pressure with aging of the field. The capital costs for design, construction, and operation of a medium sized geothermal power plant presently exceeds $1000 per installed kilowatt based on power production at a design level for the life of the plant. However, there is no guarantee that the resources of a field under development will actually produce at its design rate for the life of the plant; and, in fact, it is not unusual for the well head pressure to begin to drop after a period of use. Particularly when condensing steam turbines are involved, a reduction in well head pressure results in a reduction in electrical output which reduces the financial return below its contemplated level, and increases the cost of power production.

It is therefore an object of the present invention to provide a new and improved method of and apparatus for producing power from geothermal fluid which overcomes, or substantially ameliorates, the prior art problems summarized above.

BRIEF DESCRIPTION OF THE INVENTION

Apparatus according to the present invention for producing power utilizing geothermal fluid comprising a two-phase mixture of geothermal steam and brine produced by a production well, includes an input conduit connecting the production well with a separator which separates the geothermal fluid into high pressure geothermal steam and geothermal brine. A connecting conduit carrying the separated high pressure steam connects the separator to a geothermal power plant which produces power from the high pressure geothermal steam. The input conduit is shorter than said connecting conduit to reduce pressure losses due to two-phase flow in the input conduit.

The geothermal power plant includes a topping steam turbine coupled to a generator, and a flow control mechanism for applying the high pressure geothermal steam to the topping steam turbine which is constructed and arranged to drive the generator and produce exhaust steam at a pressure greater than atmospheric pressure. A secondary separator receives the exhaust steam and produces steam condensate and dry low pressure steam which is applied to a condensing steam turbine coupled to a generator for producing power and exhaust steam that is below atmospheric pressure. The flow control system is effective to maintain a substantially constant flow rate of geothermal steam through the power plant in the face of decreasing pressure of the geothermal fluid such that the inlet pressure of the condensing steam turbine remains substantially constant.

A power plant utilizing a geothermal fluid comprising a mixture of steam and brine at a pressure that decreases with time is operated, according to the present invention, by separating the geothermal fluid into two channels, one containing steam and the other containing brine. The steam is expanded in a plurality of topping steam turbines, each of which is coupled to a generator and has inlet nozzles and a plurality of stages, for producing power and exhaust steam at a pressure above atmospheric pressure. The exhaust steam is dried and applied to a condensing steam turbine that drives a generator producing power, and produces exhaust steam that is condensed at a pressure below atmospheric pressure. Decreases in pressure of the geothermal fluid are compensated for by changing the extent of admission of the inlet nozzles, the number of stages of the topping turbines, or the number of topping steam turbines on-line in order to maintain a substantially constant flow rate of geothermal fluid through the power plant.

BRIEF DESCRIPTION OF THE DRAWINGS

Embodiments of the present invention are shown by way of example in the accompanying drawing wherein.

DETAILED DESCRIPTION

Figure 1:
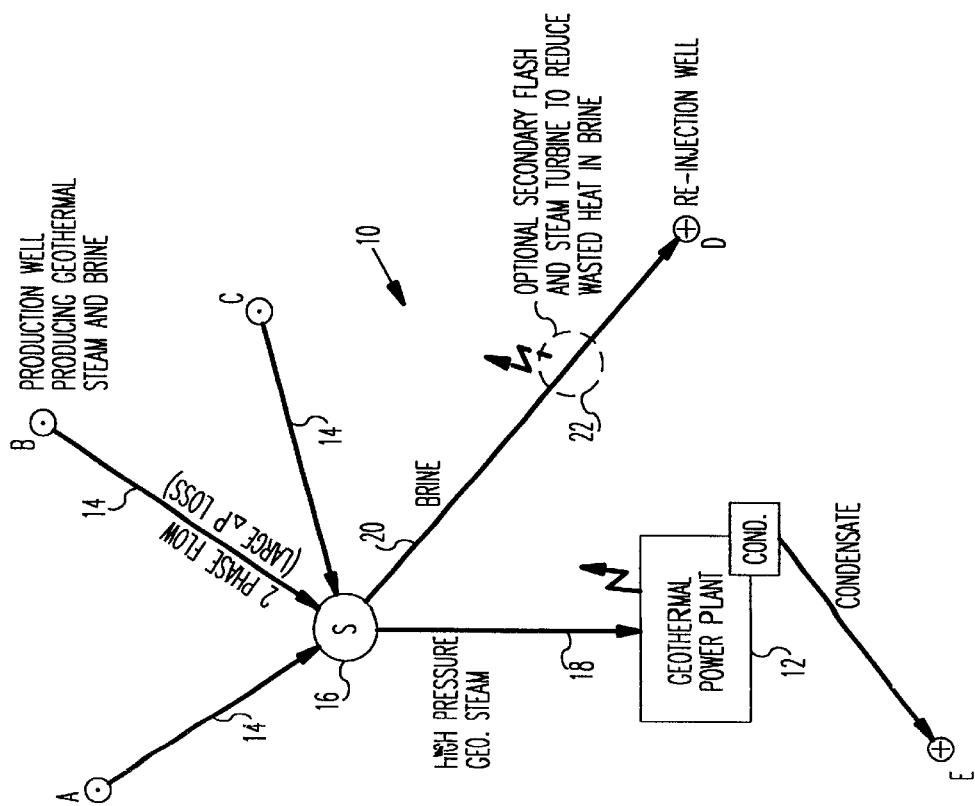
FIG. 1 designates a conventional approach to the design of a geothermal power plant using geothermal fluid form production wells that produce a mixture of geothermal steam and brine.

Referring now to the drawings, reference numeral 10 in FIG. 1 designates prior art apparatus for generating power from geothermal fluid that produces a mixture of high pressure steam and brine. Apparatus 10 comprises a plurality of production wells A, B, C, . . . in a geological field for producing the geothermal fluid which is supplied to geothermal power plant 12 by input or mixture conduits 14, which are usually many hundreds of meters in length. These conduits terminate at separator 16 located close-by the plant. Separator 16 separates the mixture of steam and brine into two channels, a steam channel and a brine channel. Steam is supplied to plant 12 via connecting or steam conduit 18, and the brine is disposed of via brine conduit 20 in re-injection well D.

Plant 12 extracts heat from the geothermal steam supplied thereto using steam turbines whose condensers are usually cooled by a source of water (not shown). The steam condensate is usually returned to a re-injection well indicated by reference character character E. Usually, condensing steam turbines are used. Such turbines are very sensitive to changes in inlet steam conditions; and the power output of these turbines is seriously impaired when the pressure at the well head decreases with aging of the geothermal field. In an effort to increase the power output of the plant, a secondary flash system and steam turbine in brine conduit 20 is sometimes employed. This optional arrangement is indicated by reference numeral 22.

A distinguishing feature of conventional power plants is the relationship between the length of inlet conduits 14, and connecting conduit 18. Conventionally, conduits 14 are very much longer, by orders of magnitude, than conduit 18. The fluid flowing through conduits 14 is a mixture of geothermal steam and brine. The nature of two-phase flow through conduits 14 is such that a significant pressure drop occurs in these conduits. As a result, the steam in conduit 18, which is supplied to plant 12, has a pressure significantly below the pressure of the steam at the well head.

Figure 2:
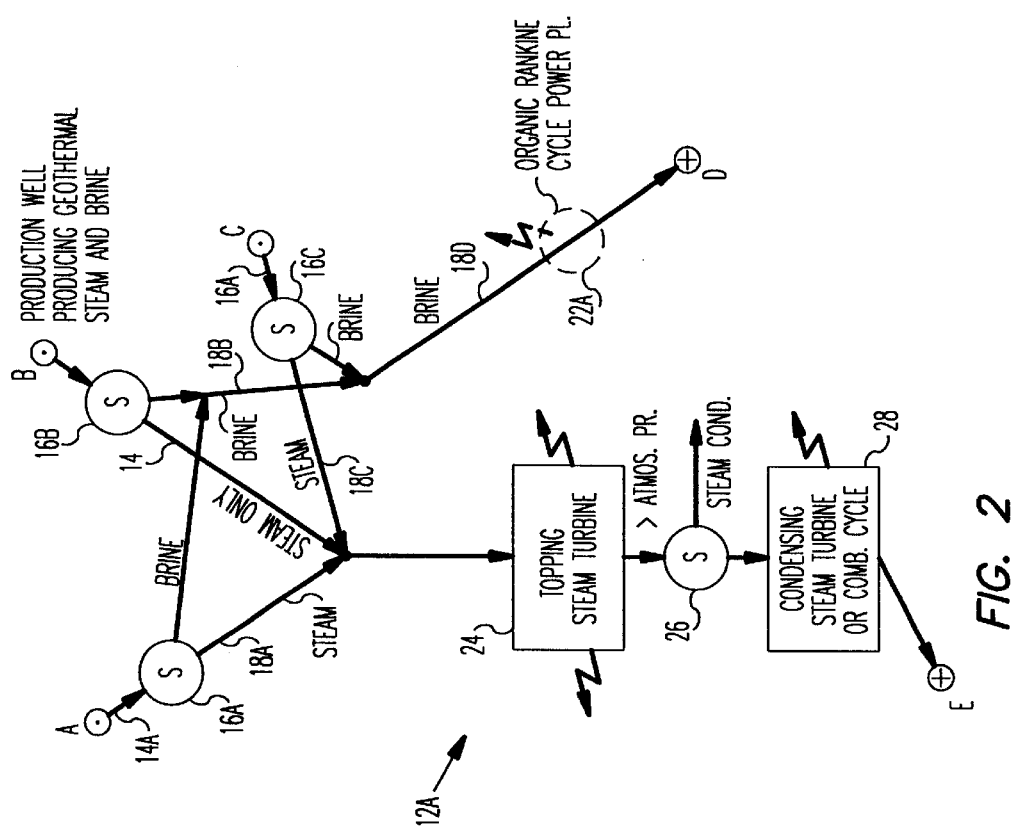
FIG. 2 shows a geothermal power plant according to the present invention.

This pressure drop between the well head and the separator reduces the power output of the power plant. This deleterious effect is overcome according to the present invention by placing separators adjacent the well heads, and separately piping the steam and the brine over the long distances to the power plant and re-injection wells. This arrangement is shown in FIG. 2 wherein the relative locations of production wells A, B, C, . . . , and power plant 12A are the same as shown in FIG. 1. However, the function of a centrally located, single separator (i.e., separator 16 in FIG. 1) is carried out, as shown in FIG. 2, by a plurality of separators located remotely from the power plant at the respective well heads. Thus, production well A has separator 16A located adjacent the well reducing considerably the length of the connection between the well and the separator. Two-phase fluid flow (i.e., a mixture of geothermal steam and brine from the production well) occurs only in shortened input conduit 14A, and single phase flow (i.e., only geothermal steam) occurs in connecting conduit 18A. As a result, the pressure drop in conduit 18A per unit length of conduit is less than the pressure drop in a conduit carrying a two-phase mixture. Consequently, geothermal steam supplied to plant 12A in FIG. 2 will be at a higher pressure than geothermal steam supplied to plant 12 in FIG. 1.

In FIG. 1, input conduit 14 is much longer than connecting conduit 18 while in FIG. 2, input conduit 14A is much shorter than connecting conduit 18A. The terms "much shorter" (e.g., 100–200 meters), and "much longer" (e.g., 400–2000 meters) as used herein means at least an order of magnitude difference, and preferably more than an order of magnitude difference.

Figure 3:
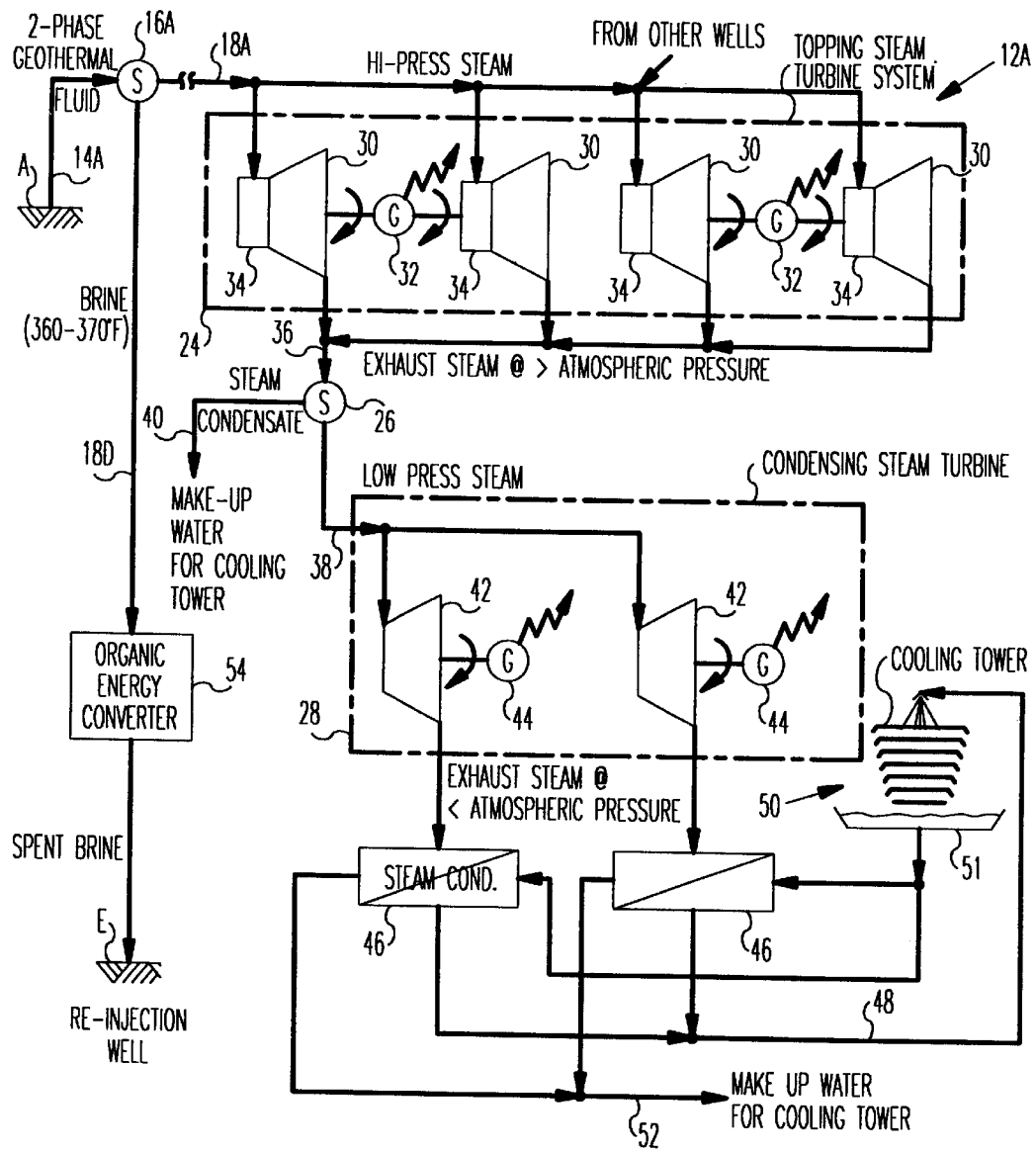
FIG. 3 shows details of the preferred form of a geothermal power plant according to the present invention.

Power plant 12A, according to the present invention, comprises topping steam turbine system 24 including at least one topping steam turbine coupled to a generator (as shown in FIG. 3), and flow control mechanism 34 for applying high pressure geothermal steam from connecting conduits 18A, 18B, arranged to drive a generator producing power. The topping steam turbine produces exhaust steam at a pressure greater than atmospheric pressure. Plant 12A also includes secondary separator 26 for receiving the exhaust steam and producing dry low pressure steam and steam condensate. The dry steam is applied to condensing steam turbine system 28 including a coupled generator (as shown in FIG. 3) which produces power and exhaust steam that is below atmospheric pressure. Steam condensate produced by separator 26 and by the condensers associated with the condensing steam turbine system may be disposed in re-injection well E.

Optionally, the condensing steam turbine system can be complemented with a combined cycle power plant of the type disclosed in co-pending application Ser. No. 08/288, 762 filed Aug. 11, 1994 (now U.S. Pat. No. 5,497,624 issued Mar. 12, 1996), and in co-pending application Ser. No. 08/145,230 filed Nov. 3, 1993, both disclosures of which are hereby incorporated by reference. As indicated in FIG. 2, heat contained in the brine produced by separators 16A, 16B, . . . can be converted into power using an organic Rankine cycle power plant of the type shown in copending application Ser. No. 08/295,036 filed Aug. 25, 1994 (now U.S. Pat. No. 5,531,073 issued Jul. 2, 1996), as indicated by reference numeral 22A. The disclosure of the '036 application is hereby incorporated by reference.

Instead of having a single plant 22A located in brine line 18D, a separate plant can be located in the brine lines associated with each of the production wells 18A, 18B, . . . The decision on the number of these plants and their location is determined by an optimizing procedure to determine the most efficient and most cost effective way to extract residual heat from the brine before its re-injection.

The preferred construction of power plant 12A is shown in FIG. 3 to which reference is now made. Topping steam turbine system 24 of plant 12A is configured as a plurality of separate modules, the number being dependent on the generating capacity of the modules and the flow-rate of geothermal fluid from the geothermal field. Each module includes topping steam turbine 30 (i.e., a steam turbine that exhausts at a pressure above atmospheric pressure) coupled to generator 32. Preferably, the modules are arranged so that a single generator is coupled between two turbines. As shown in FIG. 3, high pressure steam from connecting conduit 18A is applied in parallel to flow controls 34 that control the application of steam to the turbines. Flow controls 34 symbolically represent the means by which the flow rate through the turbines can be controlled to accommodate changing conditions in the geothermal field as explained below. Thus, FIG. 3 shows a topping steam turbine system including at least one topping steam turbine coupled to a generator, and a flow control mechanism for applying said high pressure geothermal steam to said topping steam turbine which is constructed and arranged to drive the generator and produce exhaust steam at a pressure greater than atmospheric pressure.

The exhaust steam is collected in exhaust manifold 36 and applied to secondary separator 26 which produces dry low pressure steam in line 38 and steam condensate in line 40. Steam in line 38 is applied to condensing steam turbine system 28 which may include a plurality of condensing steam turbines 42 respectively coupled to generators 44. Specifically, line 38 constitutes means for applying dry low pressure steam to condensing turbine system 28 which is constructed and arranged to drive coupled generators 44 and produce power and exhaust steam that is below atmospheric pressure.

Two condensing steam turbines are shown, but the number used in actual practice will depend on the capacities of the turbines and the power level of the power plant.

Condensing turbine system 28 usually also includes water cooled steam condensers 46 for condensing steam exhausted from turbines 44 producing condensate in output line 48. A separate condenser is shown in FIG. 3 for each turbine, but more or fewer condensers can be utilized depending on the design of the condensers, cost factors, capacity, etc.

Water to cool the condensers may be supplied from cooling tower 50 whose construction is conventional, and which includes reservoir 51 from which water is pumped to condensers 46. Condensed steam produced by the condensers is collected in line 52 and can be used as make-up water for the cooling tower to replace evaporated water. Make-up water is also available form the steam condensate produced by secondary separator 26 in line 40.

Figure 3A:
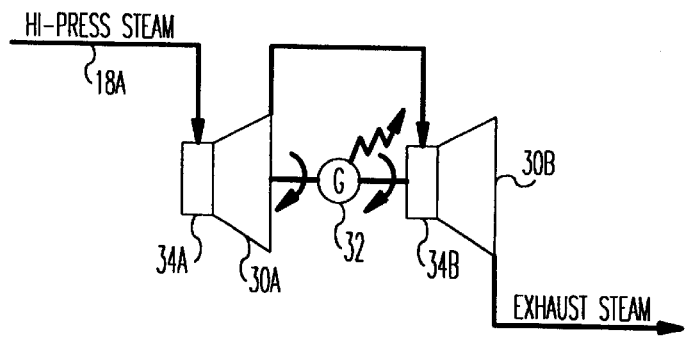
FIG. 3A shows a portion of an optional variation in the application of high pressure steam to a topping steam turbine system.

FIG. 3 shows high-pressure steam being applied in parallel to four topping turbines. However, an alternative arrangement can be used wherein the topping turbines are arranged in pairs, one being a high pressure stage, and the other being a low pressure stage. This is illustrated in FIG. 3A where high pressure steam in line 18A is applied to high pressure stage 30A on the topping turbine stage, and the exhaust form this turbine is applied to low pressure stage 30B whose exhaust is above atmospheric pressure.

In operation, geothermal steam from a production well, e.g., well A, is separated into two channels by adjacent separator 16A, into a steam channel and a brine channel. The high pressure steam in conduit 18A is supplied to topping steam turbine system 24 wherein expansion takes place producing power and exhaust steam at a pressure above atmospheric pressure. The exhaust steam is dried in separator 26, and the resultant dry, low pressure steam is applied to condensing turbine system 28 wherein expansion takes place producing power and exhaust steam below atmospheric pressure. Condensing turbines are very sensitive to changing inlet steam conditions; and as a result, their power output is seriously impaired when the geothermal field ages and the pressure at the well head decreases.

The present invention provides for helping to isolate the condensing turbines from changes in the the pressure at the well head. Compensation for reductions in the well head pressure is achieved by reason of the modular nature of the topping steam turbine system, and the provision of flow controls for the topping steam turbines shown symbolically as components 34. For example, as the well head pressure decreases, additional modules easily can be brought on line, and the degree of admission of the nozzles of the flow controls can be increased in order to reduce flow resistance through the topping turbines and maintain mass flow to the condensing turbines thus insulating the condensing turbines from changing field conditions. In case of extreme changes, the turbine wheel may be replaced. Such modifications can be used to compensate for decreases in pressure of the geothermal fluid by maintaining a substantially constant flow rate of geothermal steam through the power plant.

Finally, brine in line 18D from separator 16A is supplied to an organic energy converter such as described in co-pending application Ser. No. 08/295,036 filed Aug. 25, 1994 the disclosure of which is hereby incorporated by reference. Such energy converter is illustrated schematically in FIG. 4 by reference numeral 54. Organic energy converter 54 is responsive to geothermal brine in line 18D for producing power and spent geothermal brine which is disposed of in re-injection well E.

Organic energy converter 54 includes heat exchanger 56, which contains liquid organic fluid, and which receives geothermal brine in line 18D, producing vaporized organic fluid in line 58 and spent geothermal brine. An organic vapor turbine, shown schematically as component 60, coupled to generator 62 is responsive to the vaporized organic fluid and drives generator 62 which produces power, and produces heat depleted vaporized organic fluid which is supplied to air-cooled condenser 64. Heat depleted vaporized organic fluid is condensed in condenser 64 producing liquid organic fluid that is pumped back to heat exchanger 56. Preferably, pre-heater 66 is interposed between condenser 64 and heat exchanger 56. Pre-heater 66 receives the spent geothermal brine produced by heat exchanger 56 so that residual heat in the spent geothermal brine is used to preheat liquid organic fluid before it is vaporized in vaporizer 56.

Figure 4:
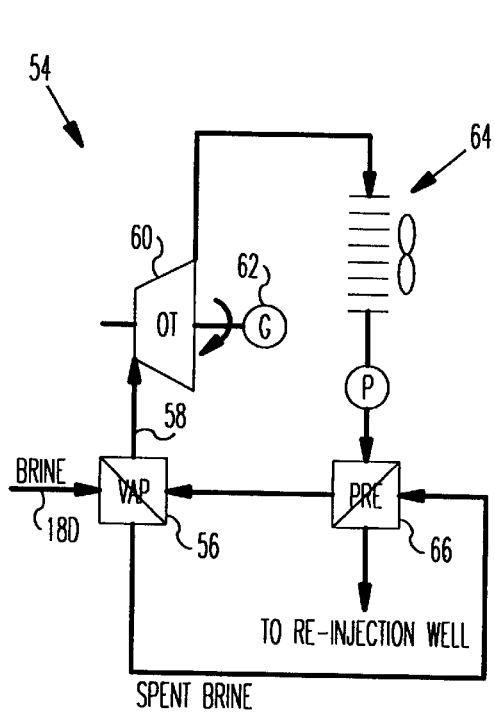
FIG. 4 shows details of a preferred form of an organic energy converter for utilizing brine in the geothermal fluid.
Figure 4A:
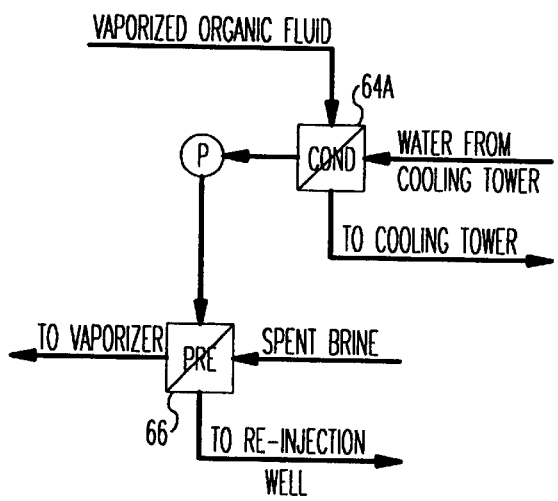
FIG. 4A shows a water cooled alternative to the air-cooled condenser in FIG. 4.

Instead cooling condenser 64 with air, as shown in FIG. 4, water cooled condenser 64A can be used as shown in FIG. 4A. In this modification, the heat depleted vaporized organic fluid produced by turbine 60 is condensed using water form a cooling tower, which may be cooling tower 50, or a separate cooling tower. The liquid organic fluid produced by condenser 64A is preheated in preheater 66 to which steam condensate is supplied in the same manner as shown in FIG. 4.

Figure 4B:
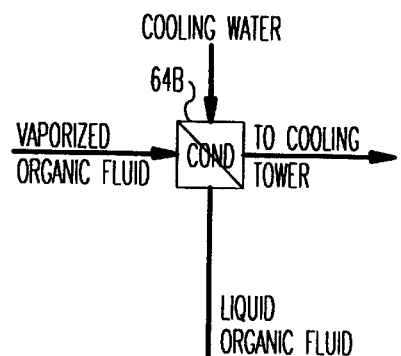
FIG. 4B shows a modification of the preheater arrangement shown in FIG. 4 for the purpose of using residual heat in the brine for preheating the organic fluid shown together with a water cooled condenser alternative.
Figure 4B:
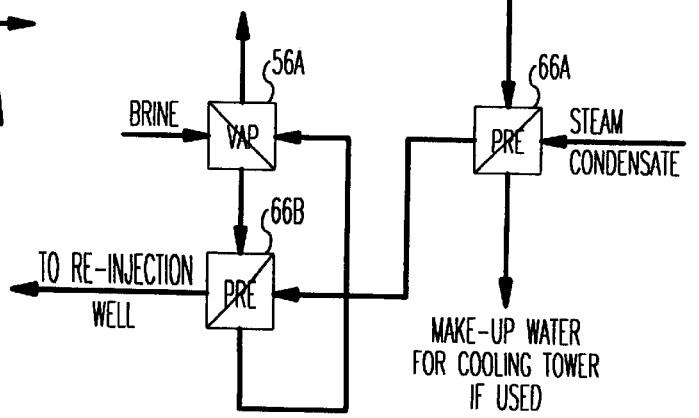

To utilize heat remaining in the steam condensate exiting separator 26 in FIG. 3, the arrangement shown in FIG. 4B can be used. Specifically, brine that exits vaporizer 56A further preheats liquid brine in preheater 66B. That is to say, liquid organic fluid produced by condenser 64 is preheated in preheater 66A using steam condensate, and further preheated in preheater 66B using brine that exits vaporizer 56A. Steam condensate exiting preheater 66A also can be used as make-up water for a cooling tower used to supply cooling water for cooling condenser 64A.

Figure 5:
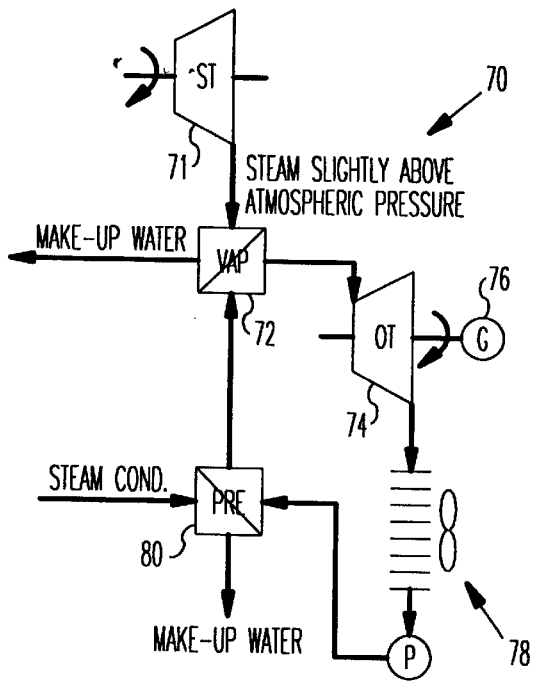
FIG. 5 is an optional configuration for the steam condensers of the power plant.

Instead of using the condensing steam turbine system shown in FIG. 3, a steam turbine system that exhausts at a pressure slightly above atmospheric pressure (represented by turbine 71 in FIG. 5) can be used with organic fluid system 70. In this system, steam exhausted from turbine 71 is at a pressure slightly above atmospheric pressure, is applied to heat exchanger vaporizer 72 containing liquid organic fluid which is vaporized as a result producing vaporized organic fluid that is applied to organic fluid vapor turbine 74 coupled to generator 76 which produces power. Condensation in heat exchanger 76 takes place at a pressure slightly above atmospheric pressure. The expanded organic vapor exhausted from turbine 74 is condensed in condenser 78, shown as being air-cooled, producing liquid organic fluid that is preheated in preheater 80 before being pumped back into vaporizer 72. If preferred, steam condensate exiting preheater 80 can be used as make-up water for a cooling tower, which can also be associated with a water-cooled condenser used instead of the air cooled organic fluid condenser shown as 78 in FIG. 5.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for operating a power plant utilizing a geothermal fluid comprising a mixture of steam and brine at a pressure that decreases with time, and which is separated into two channels, one containing steam and the other containing brine, said method comprising:
   a) expanding the steam in a plurality of topping steam turbines, each of which is coupled to a generator and has inlet nozzles and a plurality of stages, for producing power and exhaust steam at a pressure above atmospheric pressure;
   b) drying said exhaust steam to produce dried steam;
   c) applying said dried steam to a condensing steam turbine system, included in said geothermal power plant, that drives a generator producing power, and produces exhaust steam at a pressure below atmospheric pressure;
   d) condensing the exhaust at a pressure below atmospheric pressure; and
   e) accommodating for changes in pressure of said geothermal fluid by changing the extent of admission of said inlet nozzles, or the number of stages of the topping turbines in order to maintain substantially constant flow conditions at the inlet of said condensing steam turbine system.

2. Apparatus for utilizing a geothermal fluid comprising a two-phase mixture of geothermal steam and brine produced by at least one production well, said apparatus comprising:
   a) at least one separator;
   b) an input conduit connecting said at least one production well with said at least one separator which is constructed and arranged to separate said geothermal fluid into high pressure geothermal steam and geothermal brine;
   c) a geothermal power plant; and
   d) a connecting conduit connecting said at least one separator to said geothermal power plant which is constructed and arranged to produce power from at least said high pressure geothermal steam;
   e) said input conduit being much shorter than said connecting conduits
   f) wherein said geothermal power plant comprises:
      i) a topping steam turbine system including at least one topping steam turbine coupled to a generator, and a flow control mechanism for applying said high pressure geothermal steam to said topping steam turbine which is constructed and arranged to drive the generator and produce exhaust steam at a pressure greater than atmospheric pressure;
      ii) a secondary separator for receiving said exhaust steam and producing dry low pressure steam and steam condensate;
      iii) a condensing steam turbine system including a coupled generator; and
      iv) means for applying said dry low pressure steam to said condensing turbine system which is constructed and arranged to drive the coupled generator and produce power and exhaust steam that is below atmospheric pressure.

3. Apparatus according to claim 2 wherein said condensing turbine system includes a steam condenser for condensing said exhaust steam that is below atmospheric pressure and producing condensate.

4. Apparatus according to claim 3 including a cooling tower for cooling water, and wherein said steam condenser is cooled with water from said cooling tower.

5. Apparatus according to claim 4 wherein condensate produced by said steam condenser provides make-up water to said cooling tower.

6. Apparatus according to claim 3 wherein said steam condensate from said secondary separator provides make-up water for a cooling tower used to provide cooling water for said steam condenser.

7. Apparatus according to claim 1 including an energy converter responsive to said geothermal brine for producing power and spent geothermal brine.

8. Apparatus according to claim 7 including a re-injection well for disposing of said spent geothermal brine.

9. Apparatus according to claim 7 wherein said energy converter includes:
   a) a heat exchanger containing liquid organic fluid for receiving said geothermal brine and producing vaporized organic fluid and spent geothermal brine;
   b) and organic vapor turbine coupled to a generator and responsive to said vaporized organic fluid for driving said generator which produced power, and for producing heat depleted vaporized organic fluid;
   c) an organic condenser for condensing said heat depleted vaporized organic fluid to liquid organic fluid; and
   d) means for returning said liquid organic fluid to said heat exchanger.

10. Apparatus according to claim 2 wherein said geothermal power plant includes:
    a) a steam turbine system including a coupled generator;
    b) a heat exchanger containing liquid organic fluid for receiving exhaust steam from said steam turbine at substantially atmospheric pressure and producing vaporized organic fluid and steam condensate;
    c) an organic vapor turbine coupled to a generator and responsive to said vaporized organic fluid for driving said generator which produces power, and for producing heat depleted vaporized organic fluid;
    d) an organic condenser for condensing said heat depleted vaporized organic fluid to liquid organic fluid; and
    e) means for returning said liquid organic fluid to said heat exchanger.

11. Apparatus according to claim 2 wherein said flow control mechanism is constructed and arranged to modify flow in such a way that the flow conditions at the inlet to said steam condensing turbine system remain substantially constant in the face of changes in the pressure of the high pressure steam.

12. Apparatus for utilizing a geothermal fluid comprising a two-phase mixture of geothermal steam and brine produced by at least one production well, said apparatus comprising:
    a) a primary separator for separating said geothermal fluid into high pressure geothermal steam and geothermal brine;
    b) a topping steam turbine system having at least a pair of steam turbines coupled to a generator that is interposed between the turbines of said at least one pair of steam turbines;

c) means for applying said high pressure geothermal steam in parallel to said at least one pair of steam turbines thus expanding said high pressure geothermal steam and driving said generator and producing exhaust steam at a pressure greater than atmospheric pressure;

d) a secondary separator for receiving said exhaust steam and producing dry low pressure steam and steam condensate;

e) a condensing steam turbine coupled to a generator; and f) means for applying said dry low pressure steam to said condensing turbine which is constructed and arranged to drive the coupled generator and produce power and exhaust steam that is below atmospheric pressure.

13. Apparatus according to claim 12 wherein said condensing turbine system includes a steam condenser for condensing said exhaust steam that is below atmospheric pressure and producing condensate.

14. Apparatus according to claim 13 including a cooling tower for cooling water, and wherein said steam condenser is cooled with water from said cooling tower.

15. Apparatus according to claim 12 wherein said topping steam turbine system includes flow control means constructed and arranged so that the flow conditions at the inlet to said condensing steam turbine remains substantially constant in the face of changes in the pressure of the high pressure geothermal steam.

16. Apparatus according to claim 12 including an energy converter responsive to said geothermal brine for producing power and spent geothermal brine.

17. Apparatus according to claim 16 including a re-injection well for disposing of said spent geothermal brine.

18. Apparatus according to claim 16 wherein said energy converter includes:

a) a heat exchanger containing liquid organic fluid for receiving said geothermal brine and producing vaporized organic fluid and spent geothermal brine;

b) an organic vapor turbine coupled to a generator and responsive to said vaporized organic fluid for driving said generator which produces power, and for producing heat depleted vaporized organic fluid;

c) an organic condenser for condensing said heat depleted vaporized organic fluid to liquid organic fluid; and d) means for returning said liquid organic fluid to said heat exchanger.

19. Apparatus according to claim 18 wherein said means for returning said liquid organic fluid to said heat exchanger includes a preheater which receives said liquid organic fluid and said spent brine for preheating said liquid organic fluid before it is returned to said heat exchanger.

20. Apparatus according to claim 19 wherein said means for returning said liquid organic fluid to said heat exchanger includes a further heat exchanger which receives said liquid organic fluid from said organic condenser and said steam condensate from said secondary separator, and preheats said liquid organic fluid prior to supplying it to said preheater.

21. A method according to claim 1 including interposing said generator between a pair of said topping turbines.

22. A method according to claim 21 including supplying said steam in parallel to said plurality of topping turbines.

23. A method according to claim 21 including arranging, said plurality of topping turbine in pairs, one turbine of a pair being a high pressure turbine and the other of said pair being a low pressure turbine, the exhaust of the high pressure turbine being applied to said low pressure turbine.

24. Apparatus according to claim 20 wherein the steam condensate exiting said further heat exchanger provides make-up water for a cooling tower used to provide cooling water for said organic condenser.

25. Apparatus according to claim 12 including means that accommodate for changes in pressure of said geothermal fluid by changing the extent of admission of inlet nozzles in order to maintain constant flow conditions at the inlet of said condensing steam turbine.

26. Apparatus according to claim 9 wherein said means for returning said liquid organic fluid to said heat exchanger includes a preheater that receives said liquid organic fluid and said brine for preheating said liquid organic fluid before it is returned to said heat exchanger.

27. Apparatus according to claim 26 wherein said means for returning said liquid organic fluid to said heat exchanger includes a further heat exchanger which receives said liquid organic fluid from said organic condenser and said steam condensate from said secondary separator, and preheats said liquid organic fluid prior to supplying it to said preheater.

28. Apparatus according to claim 27 wherein the steam condensate exiting said further heat exchanger provides make-up water for a cooling tower to provide cooling water for said organic condenser.

29. A method according to claim 21 including the step producing power using an energy converter responsive to said geothermal brine.

30. A method according to claim 29 including the steps of:

a) receiving said geothermal brine in a heat exchanger containing liquid organic fluid and producing vaporized organic fluid and spent geothermal brine;

b) producing power by use of an organic vapor turbine coupled to a generator which is responsive to said vaporized organic fluid;

c) condensing heat depleted vaporized organic fluid exiting said organic vapor turbine in a organic fluid condenser to liquid organic fluid; and d) returning said liquid organic fluid to said heat exchanger.

31. A method according to claim 30 including preheating said liquid organic fluid in a further heat exchanger that receives said liquid organic fluid from said organic fluid condenser and said steam condensate from said secondary separator.

32. A method according to claim 31 including providing make-up water that provides cooling water for said organic fluid condenser using the steam condensate exiting said further heat exchanger.

33. A method according to claim 1 wherein the step of accommodating for changes in pressure of said geothermal fluid in order to maintain substantially constant flow conditions at the inlet of said condensing steam turbine system is carried out by changing the extent of admission of said inlet nozzles.

34. A method according to claim 1 wherein the step accommodating for changes in pressure of said geothermal fluid in order to maintain substantially constant flow conditions at the inlet of said condensing steam turbine system is carried out by changing the number of stages of the topping turbines.

35. A method according to claim 21 wherein the step of accommodating for changes in pressure of said geothermal fluid in order to maintain substantially constant flow conditions at the inlet of said condensing steam turbine system is carried out by changing the number of topping steam turbine on-line.

36. Apparatus according to claim 2 wherein said at least one topping steam turbine coupled to a generator comprises at least a pair of topping steam turbines coupled to a generator that is interposed between the turbines of said at least one pair of topping steam turbines.

37. Apparatus according to claim 11 wherein said flow control mechanism includes means that change the extent of admission of inlet nozzles of said topping steam turbines.

38. Apparatus according to claim 36 wherein said flow control mechanism includes means that change the number of said topping steam turbines on-line.

39. Apparatus according to claim 12 including means that accommodate for changes in pressure of said geothermal fluid by changing the number of stages of the topping turbines in order to maintain constant flow conditions at the inlet of said condensing steam turbine.

40. Apparatus according to claim 24 including means that accommodate for changes in pressure of said geothermal fluid by changing of the number of topping steam turbines on-line in order to maintain constant flow conditions at the inlet of said condensing steam turbine.

41. Apparatus according to claim 11 wherein said flow control mechanism includes means that change the number of stages of said at least one topping steam turbine.

* * * * *